United States Patent
Reindle et al.

(10) Patent No.: US 6,807,260 B2
(45) Date of Patent: *Oct. 19, 2004

(54) TELEPHONE LINE MANAGEMENT AND ENVIRONMENTAL INFORMATION MONITORING SYSTEM

(75) Inventors: Mark E. Reindle, Parma, OH (US); Jonathan Katz, Solon, OH (US)

(73) Assignee: Royal Appliance Mfg. Co., Glenwillow, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/337,541

(22) Filed: Jan. 7, 2003

(65) Prior Publication Data

US 2003/0099339 A1 May 29, 2003

Related U.S. Application Data

(63) Continuation of application No. 10/087,645, filed on Mar. 1, 2002, now Pat. No. 6,707,895, which is a continuation-in-part of application No. 09/989,644, filed on Nov. 20, 2001, now Pat. No. 6,671,369

(60) Provisional application No. 60/346,490, filed on Jan. 7, 2002.

(51) Int. Cl.[7] .................. H04M 1/56; H04M 15/06; H04M 1/66; H04M 3/00

(52) U.S. Cl. ............... 379/142.01; 379/47; 379/49; 379/142.13; 379/142.17; 379/199

(58) Field of Search ............... 379/33, 37, 39–51, 379/142.01, 142.17, 32.01, 32.04, 199, 418; 340/539–541, 565, 571

(56) References Cited

U.S. PATENT DOCUMENTS

| | | | |
|---|---|---|---|
| 4,211,895 A | * | 7/1980 | Davis et al. ............... 370/384 |
| 4,847,577 A | * | 7/1989 | Gerhart et al. ............. 327/37 |
| 5,467,388 A | | 11/1995 | Redd, Jr. et al. ....... 379/210.02 |
| 5,553,125 A | | 9/1996 | Martensson ............. 455/412.2 |
| 5,659,602 A | | 8/1997 | Gay ..................... 379/142.01 |
| 5,748,709 A | | 5/1998 | Sheerin .................. 379/88.22 |
| 5,883,942 A | | 3/1999 | Lim et al. ............. 379/142.01 |
| 5,920,623 A | * | 7/1999 | Bensman et al. .......... 379/361 |
| 5,923,731 A | * | 7/1999 | McClure ..................... 379/33 |
| 5,970,128 A | | 10/1999 | Kim ...................... 379/142.01 |
| 5,999,094 A | * | 12/1999 | Nilssen ...................... 340/507 |
| 6,044,148 A | | 3/2000 | Bleile ..................... 379/373.02 |
| 6,118,859 A | * | 9/2000 | Giethoorn ............. 379/142.06 |
| 6,130,936 A | * | 10/2000 | Hartmann ............. 379/142.01 |
| 6,137,871 A | | 10/2000 | Maier et al. .......... 379/142.06 |
| 6,160,477 A | | 12/2000 | Sandelman et al. ........ 340/506 |
| 6,163,270 A | * | 12/2000 | Silverman ................... 340/3.3 |
| 6,181,244 B1 | | 1/2001 | Hall et al. ................... 340/541 |
| 6,195,421 B1 | | 2/2001 | Chen .................... 379/142.01 |
| 6,281,790 B1 | | 8/2001 | Kimmel et al. ............. 340/506 |
| 6,304,642 B1 | * | 10/2001 | Beamish et al. ....... 379/142.01 |
| 6,332,021 B2 | * | 12/2001 | Latter et al. ........... 379/142.01 |
| 6,346,890 B1 | * | 2/2002 | Bellin ...................... 340/825.52 |
| 6,553,100 B1 | * | 4/2003 | Chen et al. .................... 379/37 |
| 6,671,369 B2 | * | 12/2003 | Reindle ...................... 379/361 |
| 6,707,895 B2 | * | 3/2004 | Reindle et al. ......... 379/142.13 |
| 2002/0041666 A1 | * | 4/2002 | Mastro et al. ............... 379/199 |
| 2003/0185364 A1 | * | 10/2003 | Knox .................... 379/142.01 |

\* cited by examiner

*Primary Examiner*—Binh Tieu
(74) *Attorney, Agent, or Firm*—Fay, Sharpe, Fagan, Minnich & McKee, LLP

(57) ABSTRACT

A telephone line management system in communication with a telephone line is provided. In one aspect, the system includes a caller ID module operatively coupled to the telephone line for receiving and displaying a name and a telephone number of a calling party associated with a received telephone call and a false special information tone (SIT) generator module operatively coupled to the telephone line for sending a false signal on a telephone line substantially similar to at least a first part of a SIT in response to an incoming telephone call. In another aspect, the system includes a caller ID module, a false SIT generator module, and a controller for determining when the name and telephone number of a calling party is displayed and when the false signal is operationally coupled to the telephone line. In other embodiments, the system may include an answering machine module or a telephone module.

15 Claims, 10 Drawing Sheets

TELEPHONE LINE MANAGEMENT AND ENVIRONMENTAL INFORMATION MONITORING SYSTEM

CROSS-REFERENCE TO RELATED APPLICATIONS

This is a continuation-in-part application of copending prior application Ser. No. 10/087,645, filed on Mar. 1, 2002 now U.S. Pat. No. 6,707,895, which is incorporated herein by reference. Application Ser. No. 10/087,645 is a continuation-in-part application of copending prior application Ser. No. 09/989,644 filed Nov. 20, 2001 now U.S. Pat. No. 6,671,369, the disclosure of which is incorporated herein by reference. Additionally, this application claims the benefit of U.S. Provisional Application Ser. No. 60/346,490, filed on Jan. 7, 2002, the disclosure of which is also incorporated herein by reference.

BACKGROUND OF INVENTION

The invention relates to the field of telephony and more particularly to a telephone line management system. It finds particular application in conjunction with providing various combinations of features related to management of a telephone line and will be described with particular reference thereto. However, it is to be appreciated that the invention is also amenable to other applications.

Telemarketing has increased exponentially in recent times. Many people targeted by telemarketers do not desire to receive or answer the telemarketing calls. Thus, it is desirable to provide a method and apparatus that may be used to block telemarketing calls and potentially reduce or eliminate future telemarketing calls.

One method for preventing some telemarketing calls is to have your telephone number removed from the dialing list of the telemarketer. This method, however, involves effort and is only partially effective because new calling lists are constantly generated which reestablish your number as a target.

Another method to block calls is to simply take your phone off the hook when telemarketing calls are undesired. Such a method is undesirable because the method does not permit desired calls to be connected and received. The method also causes the phone to emit a loud off-hook warning signal that may annoy the owner of the phone. Instead of leaving the phone off the hook, a person may use an answering machine or a caller identification (caller ID) device to screen calls. Both of these methods are undesirable because some people do not leave messages, and some numbers cannot be identified by the caller ID device.

In view of these deficiencies, devices have been developed to permit selective blocking of calls. For instance, U.S. Pat. No. 5,467,388 discloses a method and apparatus for selectively blocking incoming calls. The patent discloses an apparatus that may be programmed to selectively block calls either by time block or by number. The user must, however, spend time to program the system and remember to activate it when the blocking function is desired. Such steps are generally undesired due to the effort required by the user. Thus, a method and apparatus that automatically blocks calls placed from a predictive dialing telemarketing system is highly desirable. Further, the method and apparatus should not require any preprogramming or activation steps. Also, the system must allow desired calls to be connected while still blocking undesired calls.

To more fully understand the concepts of the present invention, it should be understood that most large-scale automated telemarketing systems use predictive or auto-dialers to place the phone calls. These dialers obtain a number to be called from a computer database and place the telemarketing calls for the operator. If a call is connected and a live person responds, the system immediately connects the call to a salesperson, operator, or solicitor who makes a presentation. If the line is unanswered, busy, or answered by an answering machine, the system flags the number and returns to the number at a later time and recalls it. In this manner, the telemarketing system continues to call all programmed numbers until a live person answers. The system also does not waste time having the operator place unanswered calls.

In other situations where the called number has been disconnected or is otherwise no longer in service, the automated telemarketing system removes the number from its computer database. The computer differentiates the status of the number by recognizing special information tones (SITs) used in the U.S. telephone network. The network uses the SITs to provide information to computers in the network. SITs include three precise, sequential tones used to identify recorded announcements provided for ineffective call attempts in the telephone network. There are seven major SIT types, known as SIT1 through SIT7. A telemarketing system is designed to maximize outbound calls and maximize completed calls. Thus, most quality telemarketing systems are designed to recognize SITs. One of the most common SITs is SIT2 which is the intercept SIT. The intercept SIT is used to describe an uncompleted call attempt due to a nonworking number. The intercept SIT begins with a tone of 913.8 Hz that is played for 274 milliseconds. This tone is followed by a second tone of 1370.6 Hz played for 274 milliseconds and completed with a third tone at 1776.7 Hz played for 380 milliseconds. When this SIT is received by a telemarketing system using a predictive dialer, the system notes that the number called is non-working and removes it from its database so that it will not be called again.

U.S. Pat. No. 5,920,623, commonly assigned to Royal Appliance Mfg. Co., discloses a method and apparatus for defeating a predictive dialing telemarketing system. The apparatus includes a signal generator in the nature of an oscillator that is capable of creating a 914 Hz sine wave that substantially imitates the first tone of an intercept SIT (i.e., SIT2) used by the telephone network to indicate a nonworking number. The oscillator signal is amplified by an amplifier. The imitation signal is selectively sent in response to an incoming call when a controller closes a relay to connect the imitation signal to the telephone line. The controller is prompted to close the relay by an off-hook detector that indicates to the controller when a voice signal is established. In addition to this embodiment, the '623 patent contemplated the capability to create any of the known SIT sequences in full or in part. The device produced in conjunction with the '623 patent was powered using a conventional a.c. utility power adapter.

Devices capable of displaying caller ID information are increasingly common. In fact, caller ID services are one of a group of network-provided enhanced services known as custom local area signaling services (CLASS). Telecordia Technologies, Inc., Morristown, N.J., originally Bellcore, has defined three classes of caller ID services, known respectively as Type I, Type II, and Type III.

In the Type I service, a device for displaying caller ID information is equipped with a Frequency Shift Key (FSK) detector, a controller, and a display. When a call is placed to the phone, a Stored Program Control System (SPCS) server situated within the Public Switched Telephone Network (PSTN) activates a corresponding FSK generator also situated within the PSTN to transmit a FSK signal encoding the caller ID information over the telephone line. At the device for displaying caller ID information, when a first ring is detected, the controller enables the FSK detector, which listens for an FSK signal. If an FSK signal is detected before the second ring, it is demodulated to obtain the caller ID information. That information is then displayed. If, however, the FSK signal is not detected before the second ring, the FSK detector is disabled.

In the Type II or Type III service, a device for displaying caller ID information is also equipped with a Customer Premises Equipment Alerting Signal (CAS) detector. When a call is received on the telephone line, the SPCS server first determines if the telephone line is in an on-hook or off-hook condition. In the on-hook condition, the procedure described for the Type I category of service is followed. In the off-hook condition, a call waiting/caller ID service is provided in which the server first activates a corresponding CAS generator situated within the PSTN to generate and transmit a CAS signal to the phone. The CAS detector at the device for displaying caller ID information, which has been previously enabled by the controller upon the occurrence of the off-hook condition, listens for the CAS signal. Upon detecting the CAS signal, the controller mutes the audio channel to other devices connected to the telephone line, and sends a Dual Tone Multi-Frequency (DTMF) tone, which serves as an acknowledgement signal. In the case of a Type II unit, the acknowledgement signal is a DTMF 'D' tone; in the case of a Type III unit, the acknowledgement signal is a DTMF 'A' tone. Muting of the audio channel is required since the FSK signal in one implementation is transmitted at a range of frequencies, 500–2500 Hz, which is within the range of audio perception by humans.

The controller then enables the FSK detector, which listens for an FSK signal. If a FSK signal is detected before a predetermined timeout period, the FSK signal is demodulated and the caller ID information obtained and displayed. If there is a timeout before the FSK signal is detected, the controller un-mutes the audio channel, and resumes listening for a CAS signal.

Notably, no device currently combines a feature of sending a false SIT over a telephone line with displaying caller ID information. It is desirable to provide a device that includes the features of sending a false SIT over a telephone line while displaying caller ID information.

BRIEF SUMMARY OF INVENTION

Thus, there is a particular need for device that combines the feature of sending a false SIT over a telephone line with displaying caller ID information. The invention contemplates such a device that overcomes at least one of the above-mentioned problems and others.

In one aspect of the invention, an apparatus in communication with a telephone line is provided. The apparatus includes a caller identification (caller ID) module operatively coupled to the telephone line for receiving and displaying a name and a telephone number of a calling party associated with a telephone call received over the telephone line and a false special information tone (SIT) generator module operatively coupled to the telephone line for sending a false signal on a telephone line substantially similar to at least a first part of a SIT in response to an incoming telephone call.

In another aspect of the invention, a communications device in communication with a telephone line is provided. The communications device includes a caller ID module operatively connected to the telephone line for receiving and displaying a name and a telephone number of a calling party associated with a telephone call received over the telephone line, a false SIT generator module operatively connected to the telephone line for sending a false signal on a telephone line substantially similar to at least a first part of a SIT in response to an incoming telephone call, and a controller in communication with the caller ID module and the false SIT generator module, wherein the controller controls the caller ID module and determines when the name and telephone number of a calling party is displayed, wherein the controller also controls the false SIT generator module and determines when the false signal is operationally coupled to the telephone line. In an alternate embodiment, the communications device includes a caller ID module, a false SIT generator module, a first controller in communication with the caller ID module, and a second controller in communication with the false SIT generator module.

In still another aspect of the invention, a telephone line management system in communication with a telephone line is provided. The telephone line management system includes a caller ID module operatively connected to the telephone line for receiving and displaying a name and a telephone number of a calling party associated with a telephone call received over the telephone line and a false SIT generator module operatively connected to the telephone line for sending a false signal on a telephone line substantially similar to at least a first part of a SIT in response to an incoming telephone call. In another embodiment, the telephone line management system may alternatively include an answering machine module operatively connected to the telephone line for sending an outgoing audio message on the telephone line and for recording an incoming audio message from the calling party or a telephone module operatively connected to the telephone line for answering an incoming telephone call on the telephone line and for communicating with the calling party.

One advantage of the present invention is that features of sending a false SIT over a telephone line and displaying caller ID information are combined in one device.

Still further features and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

DETAILED DESCRIPTION

Figure 1:
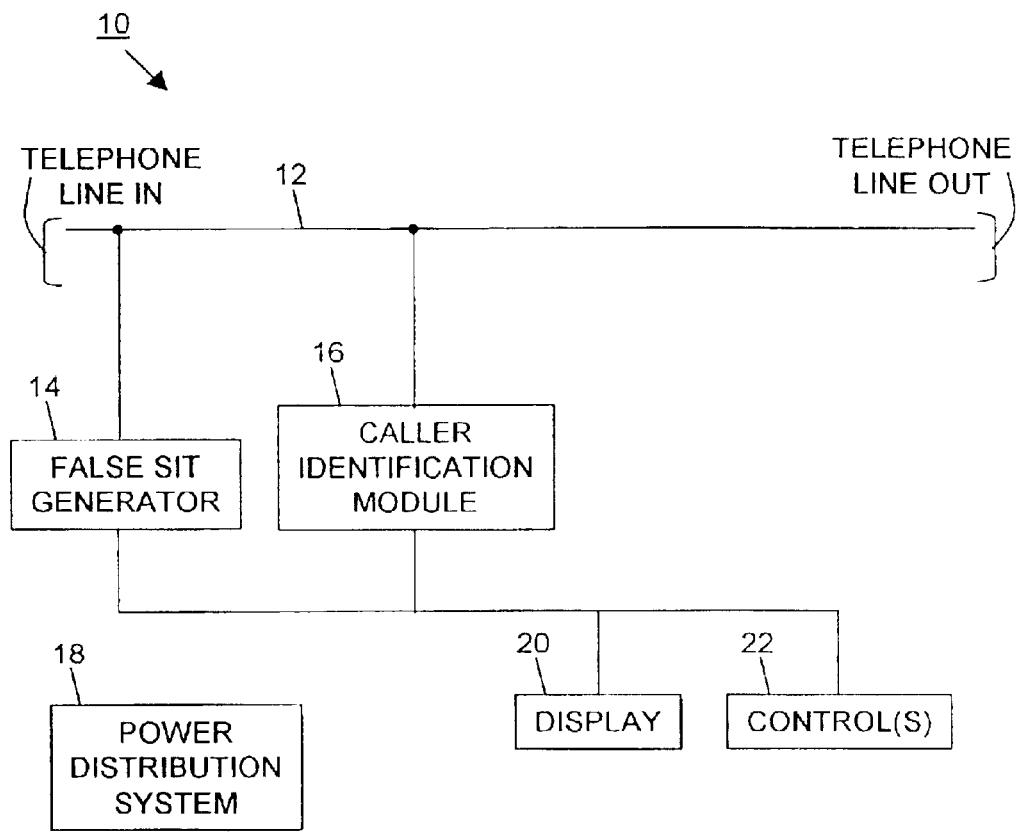
FIG. 1 is a block diagram of a telephone line management system in an embodiment of the invention.

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. Within the drawings, like reference numerals denote like elements. Like reference numerals annotated with a prime symbol (') or a double prime symbol (") denote elements in subsequent embodiments that are like or similar to the reference numeral in a first embodiment.

Referring to FIGS. 1–4, an embodiment of a telephone line management system 10 is provided. As shown in FIG. 1, the system 10 is operatively connected to a standard telephone line 12. The system 10 includes a false system information tone (SIT) generator 14, a caller identification (caller ID) module 16, a power distribution system 18, a display 20, and one or more controls 22. The false SIT generator 14 and caller ID module 16 are described in more detail below with respect to FIGS. 7 and 8, respectively.

Figure 2:
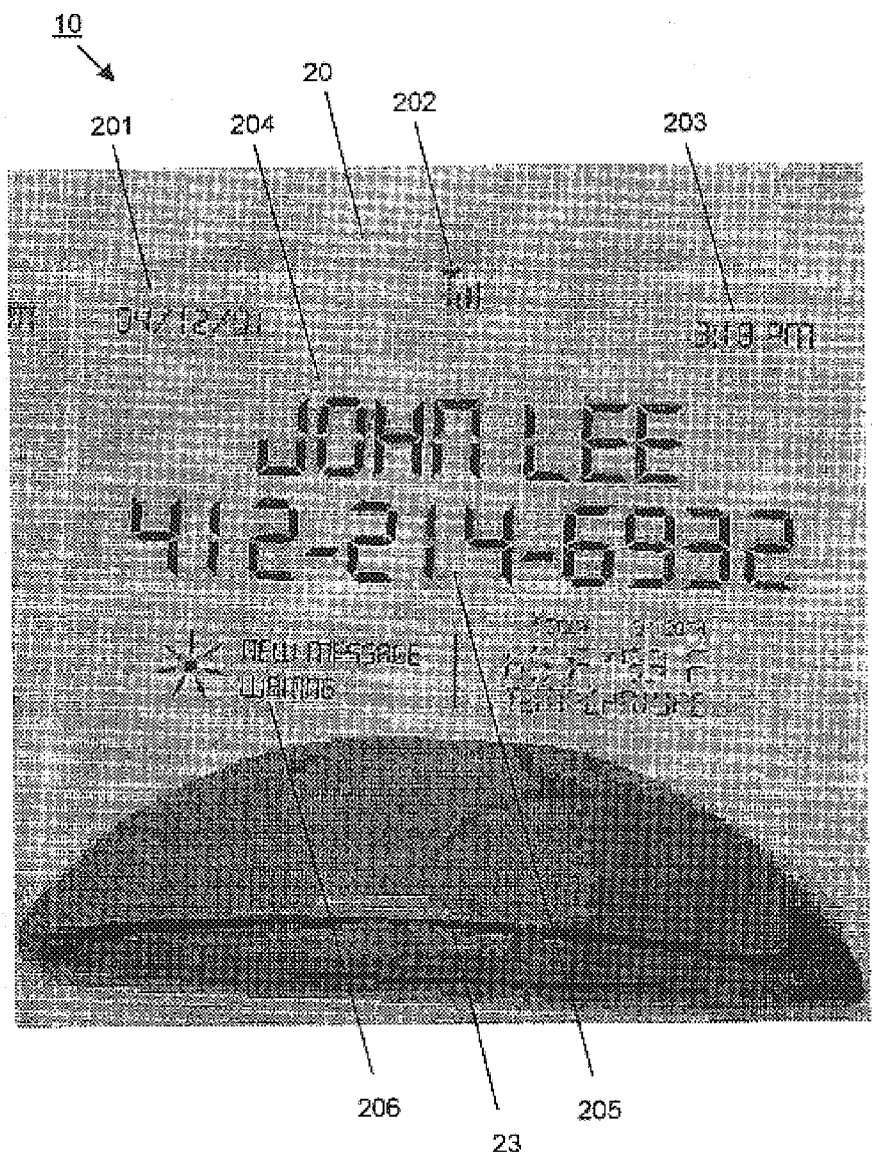
FIG. 2 is a front view of a telephone line management system in an embodiment of the invention.
Figure 3:
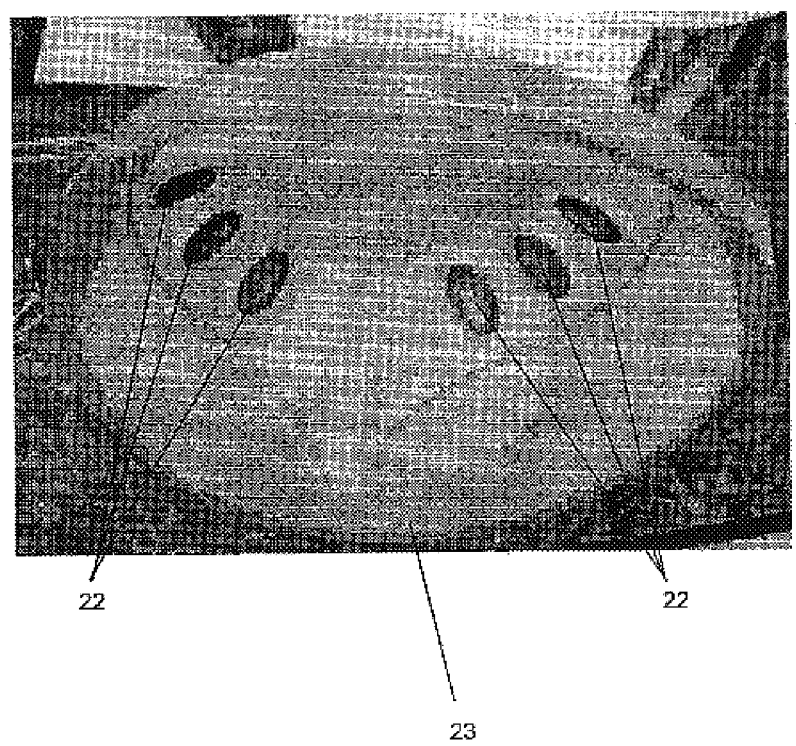
FIG. 3 is a top view of a housing associated with various embodiments of the invention.
Figure 4:
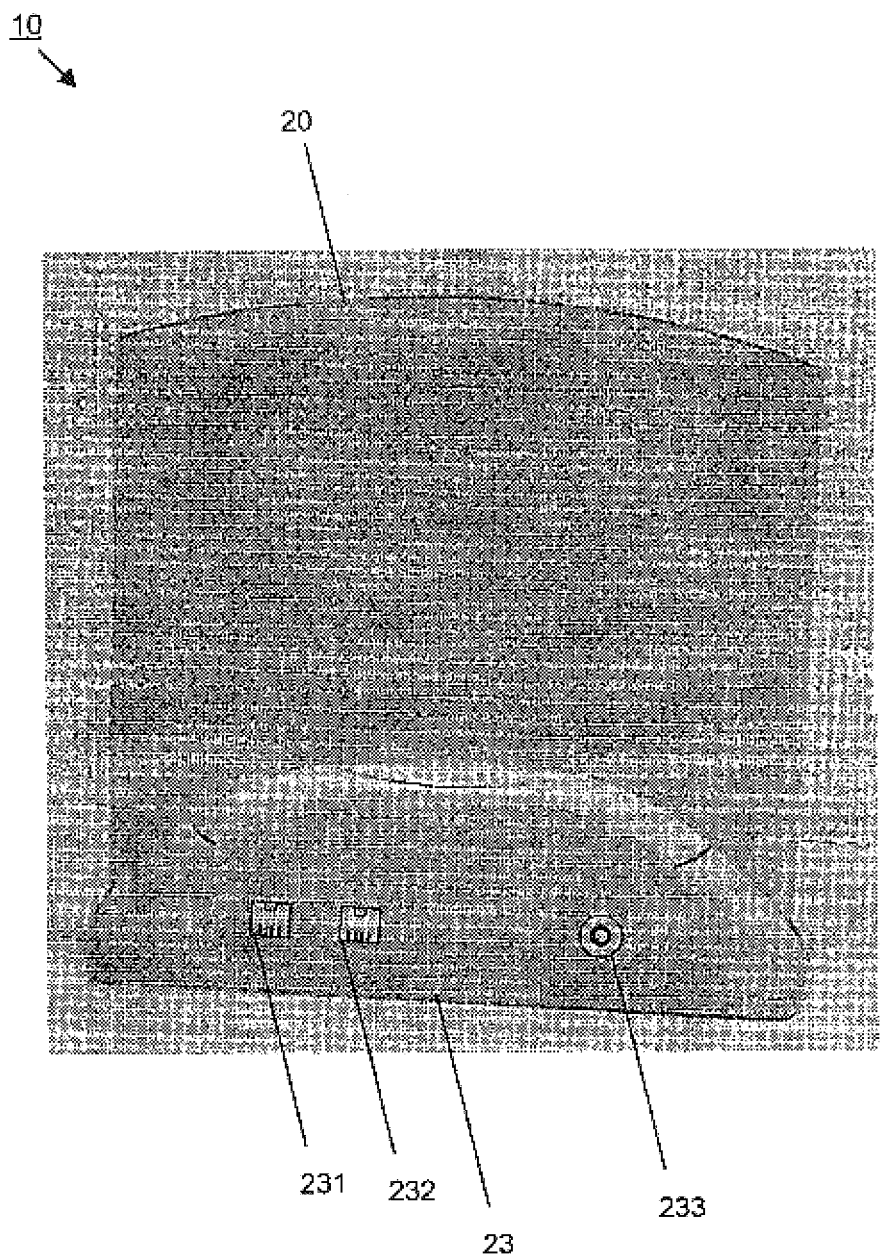
FIG. 4 is a rear view of a housing associated with various embodiments of the invention.

As shown in FIGS. 2–4, the display 20 and control(s) 22 are attached to a housing 23. The false SIT generator 14, caller ID module 16, and power distribution system 18 are installed in the housing 23. The housing 23 may be of any size and shape suitable for attachment and installation of these items.

The power distribution system 18 shown in FIG. 1 may be based on standard utility power, battery power, telephone line power, or various combinations thereof The power distribution system 18 provides the required electrical power to the false SIT generator 14, caller ID module 16, display 20, and control(s) 22.

As shown in FIG. 2, the display 20 may be a liquid crystal display (LCD). Alternatively, the display 20 may be a matrix display, flat screen display, or any type of display suitable for providing a desired combination of information. The display 20 may provide various information. For example, a current date 201, a telephone line signal strength indication 202, a current time 203, a name of a calling party 204, a telephone number of the calling party 205, and a new message waiting indication 206 may be displayed. Additional or alternative information may also be displayed As shown in FIG. 3, the control(s) 22 may include six pushbutton switches. The control(s) 22 are operated by a user to control the telephone line management system 10. There can be more or less controls depending on various control schemes. For example, a menu driven control scheme may require as few as one or two controls, while a non-menu scheme may require more controls. There can also be additional or alternate types of controls (e.g., toggle switches, slide switches, momentary or latching switches, selector switches, or potentiometers). The control(s) 22 may be used to select modes of operation for the false SIT generator 14 and caller ID module 16. The control(s) 22 may also be used to advance forward and backward through multiple names and telephone numbers of prior calling parties.

As shown in FIG. 4, the telephone line management system 10 may include three external connections. For example, a telephone line in connector 231, a telephone line out connector 232, and a power line connector 233. RJ11 connectors or any other type of telephone connector may be used for the line in and line out connectors 231, 232. Additional or alternate connectors may be included in the system 10. For example, the power line connector 233 may be unnecessary if telephone line power is used to operate the system 10.

The embodiment of the telephone line management system 10 in FIG. 14 may provide a large readable display with back-lighting for dark situations. The system 10 virtually stops telemarketers with the false SIT generator. In addition, the system 10 tells you who is calling before you answer a telephone call (i.e., Type I caller ID) and may also tell you who is calling when you are already using the telephone line (i.e., Type II or Type III caller ID). The system 10 also connects to standard telephone jacks and standard utility electrical power.

Figure 5:
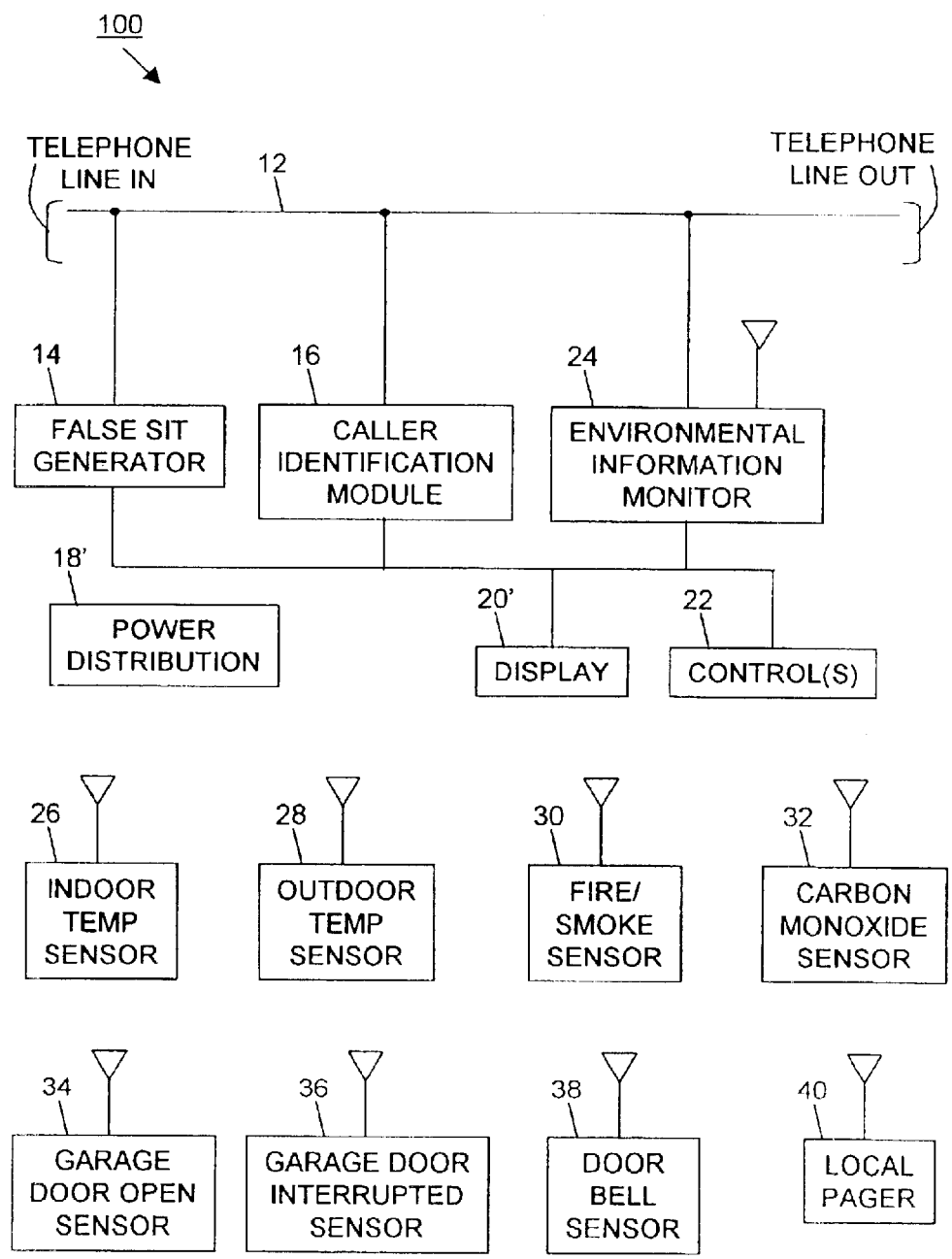
FIG. 5 is a block diagram of a telephone line management and environmental information monitoring system in an embodiment of the invention.
Figure 6:
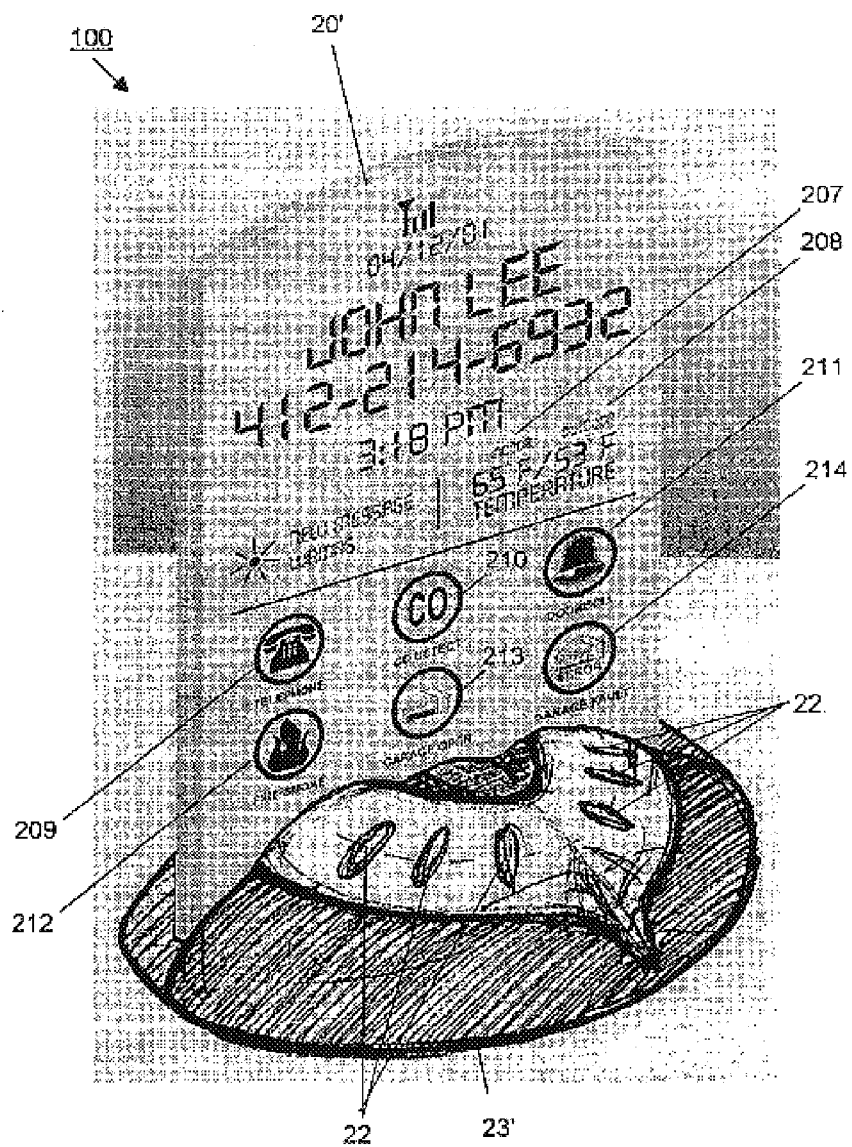
FIG. 6 is a perspective view of a telephone line management and environmental information monitoring system in an embodiment of the invention.

Referring to FIGS. 5 and 6, another embodiment of a telephone line management and environmental information monitoring system 100 is provided. As shown in FIG. 5, the system 100 is operatively connected to a standard telephone line 12. The system 100 includes a false SIT generator 14, a caller ID module 16, an environmental information monitor 24, a power distribution system 18', a display 20', and one or more controls 22. The system 100 may include and communicate with various combinations of remote devices. For example, an indoor temperature sensor 26, an outdoor temperature sensor 28, a fire/smoke sensor 30, a carbon monoxide sensor 32, a garage door open sensor 34, a garage door interrupted sensor 36, a door bell sensor 38, and a local pager 40. Communications between the system 100 and the remote devices may be via radio frequency (RF) communications, infrared communications, laser communications, or other communications techniques suitable for the desired environmental characteristic to be sensed and suitable for compatible sensors. The false SIT generator 14, caller ID module 16, and environmental information monitor 24 are described in more detail below with respect to FIGS. 7–9, respectively. The control(s) 22 are as described above for control(s) in the telephone line management system 10 of FIGS. 1–4.

As shown in FIG. 6, the display 20' and control(s) 22 of the telephone line management and environmental information monitoring system 100 are attached to a housing 23'. The false SIT generator 14, caller ID module 16, environmental information monitor 24, and power distribution system 18' are installed in the housing 23'. The housing 23' may be of any size and shape suitable for attachment and installation of these items.

The power distribution system 18' in the telephone line management and environmental information monitoring system 100 of FIG. 5 is generally as described above for the power distribution system 18 in the telephone line management system 10 of FIG. 1. In addition, the power distribution system 18' provides the required electrical power to the environmental information monitor 24.

The display 20' in the telephone line management and environmental information monitoring system 100 of FIG. 6 is generally as described above for the display 20 in the telephone line management system 10 of FIG. 2. The display 20' may provide a variety of information. For example, as shown in FIG. 6, a current indoor temperature 207, a current outdoor temperature 208, a telephone ringing indication 209, a carbon monoxide alert 210, a doorbell ringing indication 211, a fire/smoke alert 212, a garage door open indication 213, and a garage door n operation interrupted indication may be displayed. Additional or alternative information may also be displayed, including the examples listed above for the display 20 of the telephone line management system 10 in FIG. 2.

The embodiment of the telephone line management and environmental information monitoring system 100 in FIGS. 5 and 6 may provide a large readable display with backlighting for dark situations. The system 100 includes an environmental information monitor 24 that operates in conjunction with other remote devices to provide, for example, a carbon monoxide detector alert, a fire/smoke detector alert, an inside/outside temperature, a garage door open indicator, a garage door interrupted indicator, a doorbell ringing indicator, and a telephone ringing indicator. The system 100 may also include a pager that connects to the environmental information monitor 24 for around the house freedom. In addition, the system 100 virtually stops telemarketers with the false SIT generator. The system 100 also tells you who is calling before you answer a telephone call (i.e., Type I caller ID) and may also tell you who is calling when you are already using the telephone line (i.e., Type II or Type III caller ID). Additionally, the system 100 connects to standard telephone jacks and standard utility electrical power.

Figure 7:
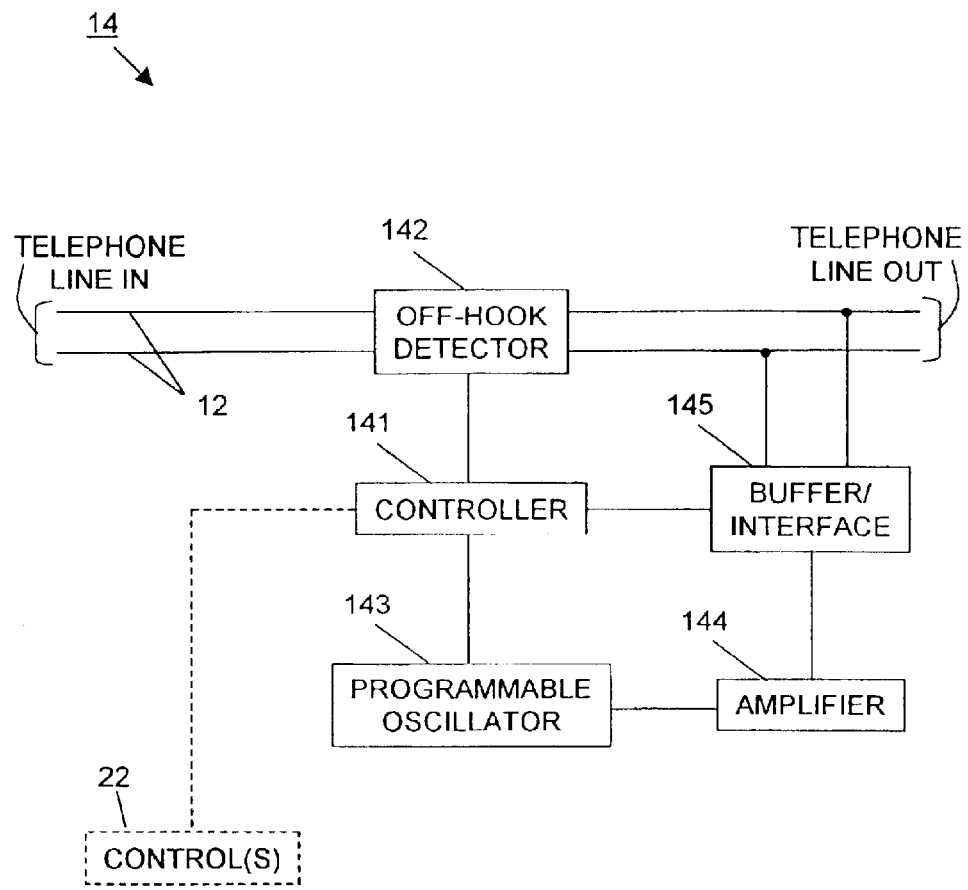
FIG. 7 is a block diagram of a false system information tone (SIT) generator associated with various embodiments of the invention.

Referring to FIG. 7, an embodiment of a false SIT generator 14 is provided. In general, the false SIT generator 14 imitates a telephone SIT by sending a false signal over the telephone line when a device places the telephone line in an off hook condition. SITs are sine wave signals that are sent at a predetermined frequency for a predetermined duration. The frequencies and durations of the SITs are generally known in the art and may be obtained from numerous sources including, for example, the Audichron Operator's Manual 0M10-0022. The apparatus of the present invention has the capability of playing any one of the seven major SIT sequences (i.e., SIT1, SIT2, SIT3, SIT4, SIT5, SIT6, and SIT7) in full or a portion thereof depending on user selection. SITs are three precise, sequential tones used to identify certain conditions related to ineffective call attempts in the telephone network.

The false SIT generator 14 has the capability to generate a false signal substantially similar to the first tone, first and second tone, or all three tones of any one of the seven major SITs depending on user selection. This is particularly useful because many telemarketing systems will, in the interest of conserving time, determine that a full SIT2 sequence has been received after the first tone in that sequence has been detected. Thus, it may only be necessary to send the first tone in the sequence. As such, a predictive dialing telemarketing system is said to be "defeated" because the false signal will cause the telemarketing system to immediately disconnect the call and remove the number from its database. Additional telemarketing systems that require the first and second tones or all three tones to determine that a full SIT2 sequence has been received may be defeated by selecting two- or three-tone operation.

Figure 10:
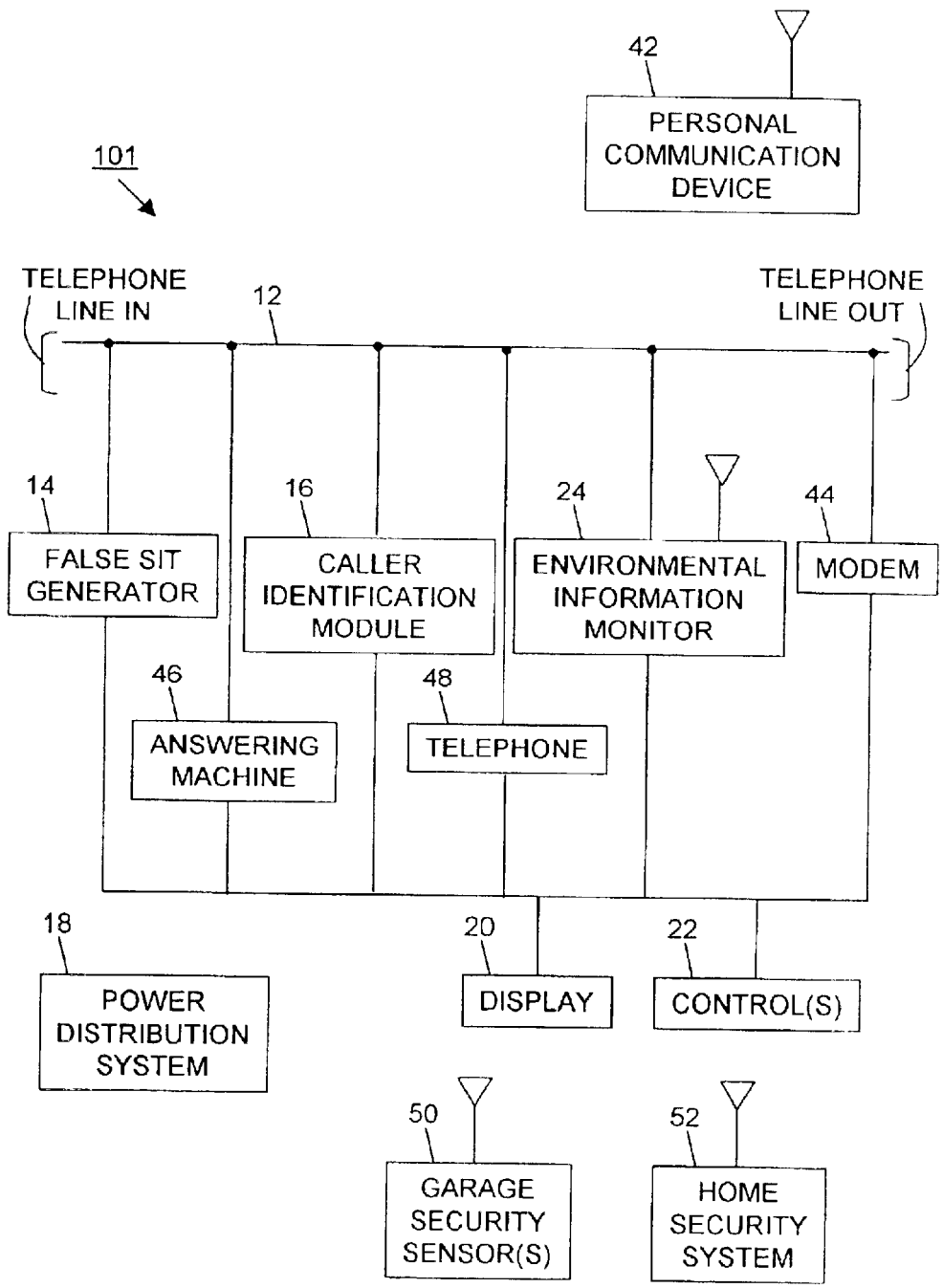
FIG. 10 is a block diagram of a telephone line management and environmental information monitoring system in another embodiment of the invention.

As shown in FIG. 7, the false SIT generator 14 includes a controller 141, an off-hook detector 142, a programmable oscillator 143, an amplifier 144, and a buffer/interface 145. The false SIT generator 14 is operatively connected to a standard telephone line 12. As shown in FIGS. 1, 5, and 10, the false SIT generator 14 may be electrically connected to a caller ID module 16, an environmental information monitor 24, a modem 44, an answering machine 46, and a telephone 48. The false SIT generator 14 may be used in conjunction with any combination of these devices and other devices compatible with the standard telephone line 12. As shown in FIGS. 1, 5, and 10 and as described above, the false SIT generator 14 receives electrical power from the power distribution system 18, 18', 18".

The controller 141 receives and processes information from the control(s) 22 according to programmed instructions. The control(s) 22 may permit a user to select one of multiple SITs and one of multiple modes of operation for generation of the false signal. For example, if seven SITs are identified as SIT1, SIT2, SIT3, SIT4, SIT5, SIT6, and SIT7 and three modes of operation are identified based on the generation of one-part, two-part, and three-part tone sequences with respect to the selected SIT, the user may select one of the seven SITs and one of the three modes of operation.

The controller 141 is also in communication with the off-hook detector 142, which in turn is in communication with the telephone line 12. The programmable oscillator 143 is capable of creating false signals that successfully imitate SITs under control of the controller 141. The controller 141 programs the programmable oscillator 143 based on SIT/mode selection by the user using the control(s) 22. When the off-hook detector 142 detects that a device has responded to a telephone call by placing the telephone line 12 in an off-hook condition, the controller 141 causes the programmable oscillator 143 to generate the false signal. For example, if the user selects SIT2 and one-part tone operation, the programmable oscillator 143 generates a 913.8 Hz sine wave for 274 ms. This signal is substantially the first portion of an intercept SIT (SIT2) which is used by the telephone network to indicate a non-working number. Alternatively, if the user selects SIT2 and three-part tone operation, the programmable oscillator 143 generates a 913.8 Hz sine wave for 274 ms, followed by a 1370.6 Hz sine wave for 274 ms, followed by a 1776.7 Hz sine wave for 380 ms.

In general, the false SIT generator 14 functions by sending an imitation SIT into the telephone line 12 when a telephone, answering machine, or other type of user device places the telephone line in an off-hook condition. This is accomplished after the off-hook detector 142 detects that the telephone line is in the off-hook condition. The controller 141 receives the signal from the off-hook detector 142 and takes the steps or performs the functions necessary to send the signal produced by the programmable oscillator 143 to the telephone line 12. By doing so, most predictive dialing telemarketing systems calling the number will receive the SIT (e.g., SIT2) and disconnect or terminate the call, and thus be defeated.

As shown in FIG. 7, the controller 141 sends the false signal imitating a SIT or a portion thereof to the telephone line 12 by activating a buffer/interface 145 that connects the signal directly to the telephone line 12. The programmable controller 143 is connected to an amplifier 144 such that the false signal produced by the programmable controller 143 may be amplified to a level that imitates the SITs used by the telephone network. The amplified false signal then is buffered and conditioned by the buffer/interface 145 before it is sent to the telephone line 12 so that the false SIT generator 14 conforms with all FCC and telephone system regulations. As shown, the controller 141 controls both the programmable controller 143 and the buffer/interface 145 based on SIT/mode selection by the user and the condition of the off-hook detector 142 and connects the false signal to the telephone line 12 after a device places the telephone line 12 in an off-hook condition. In another embodiment of the false SIT generator 14, the controller 141 may accomplish the desired function by controlling the programmable oscillator 143 without directly controlling the buffer/interface 145. In a further embodiment, the system (e.g., 10, 100, 101) may be adapted to answer an incoming call, thereby effectively detecting that the telephone line is in an off-hook condition.

Figure 8:
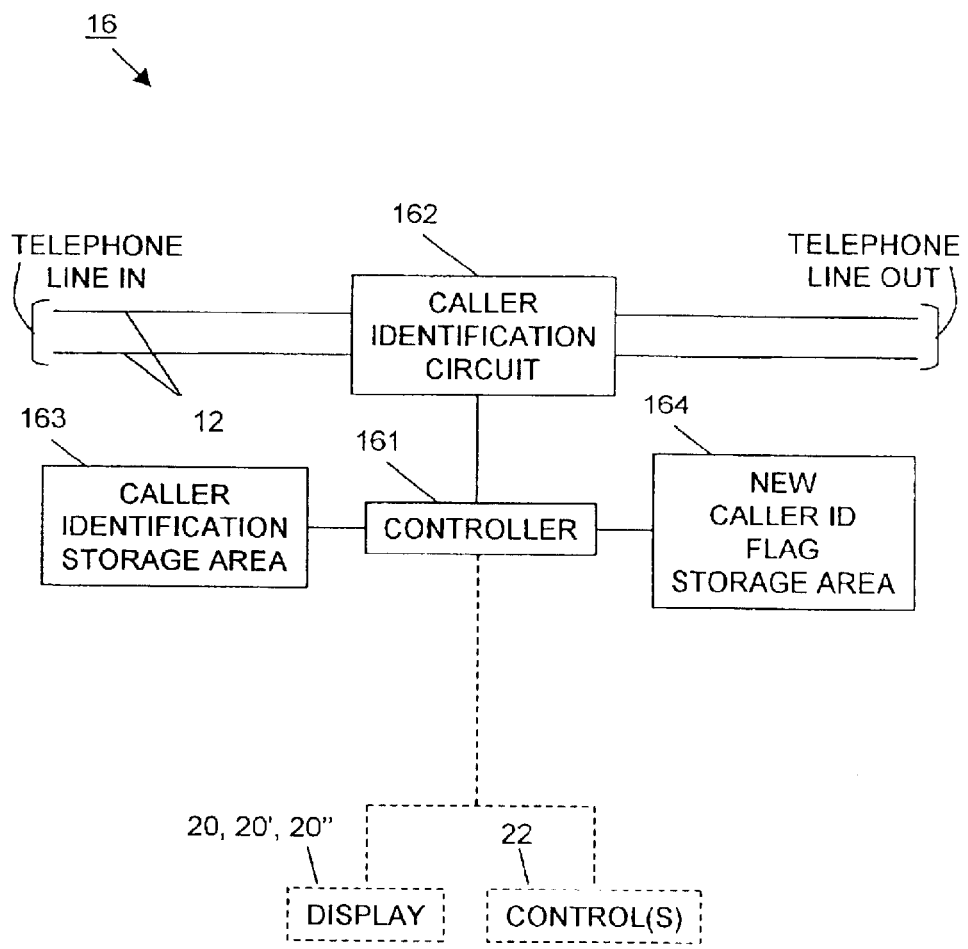
FIG. 8 is a block diagram of caller identification (caller ID) module associated with various embodiments of the invention.

Referring to FIG. 8, an embodiment of a caller ID module 16 is provided. The caller ID module 16 includes a controller 161, a caller ID circuit 162, a caller ID storage area 163, and a new caller ID flag storage area 164. The caller ID module 16 is operatively connected to a standard telephone line 12. As shown in FIGS. 1, 5, and 10, the caller ID module 16, may be electrically connected to a false SIT generator 14, an environmental information monitor 24, a modem 44, an answering machine 46, and a telephone 48. The caller ID module 16 may be used in conjunction with any combination of these devices and other devices compatible with the standard telephone line 12. As shown in FIGS. 1, 5, and 10 and as described above, the caller ID module 16 receives electrical power from the power distribution system 18, 18', 18".

When an incoming call is received on the telephone line 12, the controller 161 receives a name and a telephone number of the calling party from the caller ID circuit 162. The controller 162 stores the name and telephone number of the current calling party in the caller ID storage area 163, illuminates the name 204 and telephone number 205 on the display 20, 20', 20", sets the flag in the new caller ID flag storage area 164, and routes a new message waiting indication 206 to the display 20, 20', 20". The caller ID storage area 163 can store information for a predetermined number of calls. The user can review each call stored in the caller ID storage area 163 on the display 20, 20', 20" using the control(s) 22. If the calls stored in the caller ID storage area 163 have all been reviewed by the user, the new caller ID flag storage area 164 is reset and the new message waiting indication 206 on the display 20, 20', 20" is extinguished.

Figure 9:
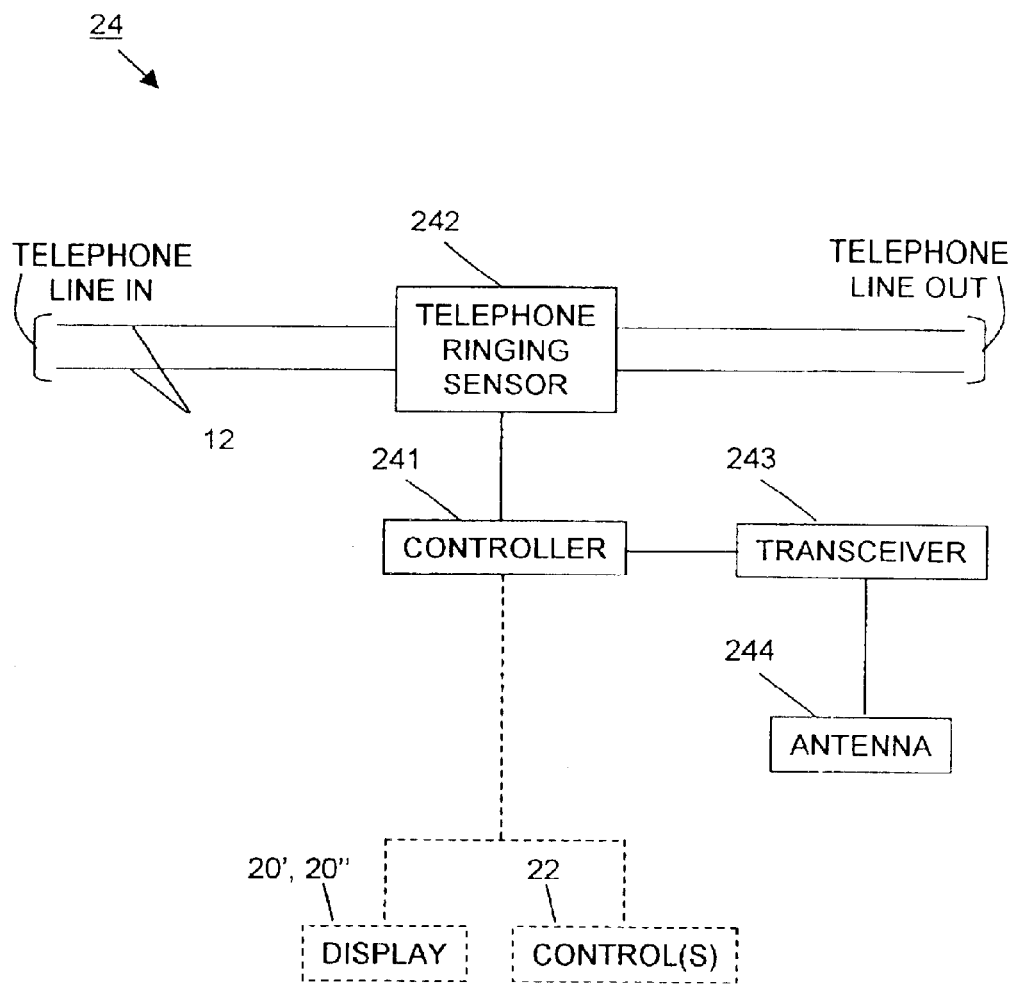
FIG. 9 is a block diagram of an environmental information monitor associated with various embodiments of the invention.

Referring to FIG. 9, an embodiment of an environmental information monitor 24 is provided. The environmental information monitor 24 includes a controller 241, a telephone ringing sensor 242, a transceiver 243, and an antenna 244. The environmental information monitor 24 is operatively connected to a standard telephone line 12. As shown in FIGS. 5 and 10, the environmental information monitor 24, may be electrically connected to a false SIT generator 14, a caller ID module 16, a modem 44, an answering machine 46, and a telephone 48. The environmental information monitor 24 may be used in conjunction with any combination of these devices and other devices compatible with the standard telephone line 12. As shown in FIGS. 5 and 10 and as described above, the caller ID module 16 receives electrical power from the power distribution system 18', 18".

When an incoming call is received on the telephone line 12, the controller 241 receives a signal from the telephone ringing sensor 242 indicating that the call is ringing. In response, the controller 241 routes a telephone ringing indication 209 to the display 20', 20".

In addition, the environmental information monitor 24 may be used in conjunction with various combinations of remote devices. The remote device may be a sensor or a local pager 40. Each remote device, similar to the environmental information monitor 24, includes a transmitter, a receiver, or a combination transmitter/receiver (i.e., a transceiver) and an antenna. Remote sensors include a sensing device that detects a certain predetermined condition within the environment of the environmental information monitor 24. When the predetermined condition is detected, the sensor transmits a signal to the environmental information monitor 24 via its transmitter and antenna. When a signal is received from a remote sensor, the controller 241 routes an appropriate indication to the display 20', 20".

For example, when a fire/smoke sensor 30 detects fire or smoke, it transmits a signal to the environmental information monitor 24 via its transmitter and antenna. When the signal is received from the fire/smoke sensor 30, the controller 241 routes a fire/smoke alert 212 to the display 20', 20".

Upon receiving signals from one or more predetermined remote sensors (e.g., fire/smoke alert 212, carbon monoxide alert 210, etc.), the controller 241 may also send a signal to the local pager 40 to provide the user notice of such a condition. When the local pager 40 receives the signal, it may annunciate or vibrate to get the user's attention and it may display a message to the user indicating that such a condition exists. The message may contain various levels of detail.

Referring to FIG. 10, another embodiment of a telephone line management and environmental information monitoring system 101 is provided. The system 101 is operatively connected to a standard telephone line 12. The system 101 includes a false SIT generator 14, a caller ID module 16, an environmental information monitor 24, a modem 44, an answering machine 46, a telephone 48, a power distribution system 18", a display 20", and one or more controls 22. In an alternate embodiment, the system 101 may communicate with the telephone system via wireless cellular, wireless satellite, or similar communications rather than the telephone line 12 using the modem 44 or telephone 48.

Like the telephone line management and environmental information monitoring system 101 of FIG. 5, the system 101 may include and communicate with various combinations of remote devices. For example, the system 101 may communication with any of the examples of remote devices shown in FIG. 5 (i.e., an indoor temperature sensor 26, an outdoor temperature sensor 28, a fire/smoke sensor 30, a carbon monoxide sensor 32, a garage door open sensor 34, a garage door interrupted sensor 36, a door bell sensor 38, and a local pager 40). In addition, the system 101 may also or alternatively communication with other remote devices. For example, as shown in FIG. 10, a personal communication device 42, a garage security sensor(s) 50, and a home security system 52.

Like the telephone line management and environmental information monitoring system 101 of FIG. 5, communications between the system 101 and the remote devices may be via radio frequency (RF) communications, infrared communications, laser communications, or other communications techniques suitable for the desired environmental characteristic to be sensed and compatible sensors. However, in addition, the system 101 may be able to communicate with the personal communication device 42 via the modem 44 using the telephone line 12. Furthermore, the system 101 may be able to communicate with the personal communication device 42 over the telephone line 12 using dual tone multifrequency tone (DTMF) signaling. As such, the personal communication device 42 may be a pager, telephone, or similar device that communicates via wireless cellular, wireless satellite, or similar communications.

The false SIT generator 14, caller ID module 16, and environmental information monitor 24 are described in more detail above with respect to FIGS. 7–9, respectively. The control(s) 22 are as described above for the telephone line management system 10 of FIGS. 1–4.

The display 20" and control(s) 22 of the telephone line management and environmental information monitoring system 101 are attached to a housing 23". The false SIT generator 14, caller ID module 16, environmental information monitor 24, modem 44, answering machine 46, telephone 48, and power distribution system 18" may be installed in the housing 23" or in an additional housing(s). The housings may be of any size and shape suitable for attachment and installation of these items.

The power distribution system 18" in the telephone line management and environmental information monitoring system 101 of FIG. 10 is generally as described above for the power distribution system 18" in the telephone line management and environmental information monitoring system 100 of FIG. 5. In addition, the power distribution system 18" provides the required electrical power to the modem 44, answering machine 46, and telephone 48.

The display 20" in the telephone line management and environmental information monitoring system 101 of FIG. 10 is generally as described above for the display 20' in the telephone line management and environmental information monitoring system 100 of FIG. 5. The display 20" may provide a variety of information. For example, a garage security alert and a home security alert may be displayed. Additional or alternative information may also be displayed, including the examples listed above for the display 20 of the telephone line management system 10 in FIG. 2 and the examples listed above for the display 20' of the telephone line management and environmental information monitoring system 100 in FIG. 6.

As described above in reference to FIGS. 7–9, each of the false SIT generator 14, caller ID module 16, and environmental information monitors 24 include a controller 141, 161, 241, respectively. It is understood that, within a system 10, 100, 101, any combination of these controllers may communicate with each other in a cooperative arrangement, master-slave arrangement, or in an arrangement that divides system processing in any manner suitable to accomplish the intended features of the system 10, 100, 101. Alternatively, the false SIT generator 14, caller ID module 16, and environmental information monitors 24 may share controllers in any combination between themselves or with one or more of the modem 44, answering machine 46, telephone 48, or other devices compatible with the standard telephone line 12. If controllers are shared, one or more controllers may be eliminated from the sharing devices. The shared controller may be located in any one of the sharing devices or in a separate module.

While the invention is described herein in conjunction with exemplary embodiments, it is evident that many alternatives, modifications, and variations will be apparent to those skilled in the art. Accordingly, the embodiment of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

What is claimed is:

1. A communications device in communication with a telephone line, including:

an environmental information monitor module with a display device;

one or more sensors to detect one or more conditions within the environment of the communications device;

a false special information tone (SIT) generator module operatively connected to the telephone line for sending a false signal on a telephone line substantially similar to at least a first part of a SIT in response to an incoming telephone call; and, a controller in communication with the environmental information monitor module, the one or more sensors, and the false SIT generator module, wherein the controller receives one or more environmental conditions detected by the one or more sensors, wherein the controller controls the environmental information monitor module and determines when the one or more environmental conditions detected by the one or more sensors are displayed on the display device, wherein the controller controls the false SIT generator module and determines when the false signal is operationally coupled to the telephone line.

2. The communications device according to claim 1, further including:

a local pager module operatively coupled to the controller, wherein the controller provides notice an environmental condition has been detected by the one or more sensors by communicating such notice to the local pager module.

3. The apparatus according to claim 2, wherein the local pager module displays information associated with the detected environmental condition.

4. The apparatus according to claim 2, wherein the local pager module provides notice an environmental condition has been detected by at least one of i) annunciating and ii) vibrating.

5. The communications device according to claim 1, further including at least one of:

a modem operatively coupled to the controller and operatively coupled to the telephone line, wherein the controller provides notice an environmental condition has been detected by the one or more sensors by communicating such notice via the telephone system;

a caller identification (caller ID) module operatively coupled to the controller and operatively connected to the telephone line for receiving a name and a telephone number of a calling party associated with a telephone call received over the telephone line, wherein the controller controls the caller ID module and determines when the name and telephone number of the calling party is displayed;

an answering machine module operatively coupled to the controller and operatively connected to the telephone line for sending an outgoing audio message on the telephone line and for recording an incoming audio message from the calling party, wherein the controller controls the answering machine; and, a telephone module operatively coupled to the controller and operatively connected to the telephone line for answering an incoming telephone call on the telephone line and for communicating with the party, wherein the controller controls the telephone module.

6. The communications device according to claim 1, wherein the environmental information monitor module is operatively coupled to the telephone line and provides notice an environmental condition has been detected by the one or more sensors by communicating such notice via the telephone system.

7. The apparatus according to claim 1, the environmental information monitor module further including:

a transmitter/receiver means in communication with the controller.

8. The apparatus according to claim 1, wherein the sensor includes a telephone ringing sensor operatively coupled to the telephone line to detect ringing on the telephone line and to communicate a telephone ringing condition to the environmental information monitor module for display on the display device.

9. The apparatus according to claim 1, wherein the sensor includes an indoor temperature sensor to communicate a current indoor temperature condition to the environmental information monitor module for display on the display device.

10. The apparatus according to claim 1, wherein the sensor includes an outdoor temperature sensor to communicate a current outdoor temperature condition to the environmental information monitor module for display on the display device.

11. The apparatus according to claim 1, wherein the sensor includes a fire/smoke sensor to communicate a carbon monoxide condition to the environmental information monitor module for display on the display device.

12. The apparatus according to claim 1, wherein the sensor includes a garage door open sensor to communicate a garage door open condition to the environmental information monitor module for display on the display device.

13. The apparatus according to claim 1, wherein the sensor includes a garage door open sensor to communicate a garage door open condition to the environmental information monitor module for display on the display device.

14. The apparatus according to claim 1, wherein the sensor includes a garage door interrupted sensor and communicates a garage door interrupted condition to the environmental information monitor module for display on the display device.

15. The apparatus according to claim 1, wherein the sensor includes a door bell sensor and communicates a door bell ringing condition to the environmental information monitor module for display on the display device.

* * * * *

UNITED STATES PATENT AND TRADEMARK OFFICE
CERTIFICATE OF CORRECTION

PATENT NO. : 6,807,260 B2
DATED : October 19, 2004
INVENTOR(S) : Mark E. Reindle et al.

It is certified that error appears in the above-identified patent and that said Letters Patent is hereby corrected as shown below:

Column 12,
Line 38, delete "modern" and insert -- modem -- therefor.

Signed and Sealed this

Eighth Day of February, 2005

JON W. DUDAS
*Director of the United States Patent and Trademark Office*